M. SWEET.
CURRY-COMBS.

No. 7,820. Reissued July 31, 1877.

Witnesses:
M. R. Edson.
Jas. D. Patterson

Inventor;
Miles Sweet
by E. E. Masson atty.

N. PETERS, PHOTO-LITHOGRAPHER, WASHINGTON, D. C.

UNITED STATES PATENT OFFICE.

MILES SWEET, OF TROY, NEW YORK.

IMPROVEMENT IN CURRY-COMBS.

Specification forming part of Letters Patent No. 89,182, dated April 20, 1869; Reissue No. 7,520, dated July 31, 1877; application filed November 11, 1876.

DIVISION A.

*To all whom it may concern:*

Be it known that I, MILES SWEET, of Troy, in the county of Rensselaer and State of New York, have invented certain new and useful Improvements in the Construction of Curry-Combs; and that the following is a full, clear, and exact description of the same, reference being had to the accompanying drawings, making a part of this specification, in which—

Figure 1:
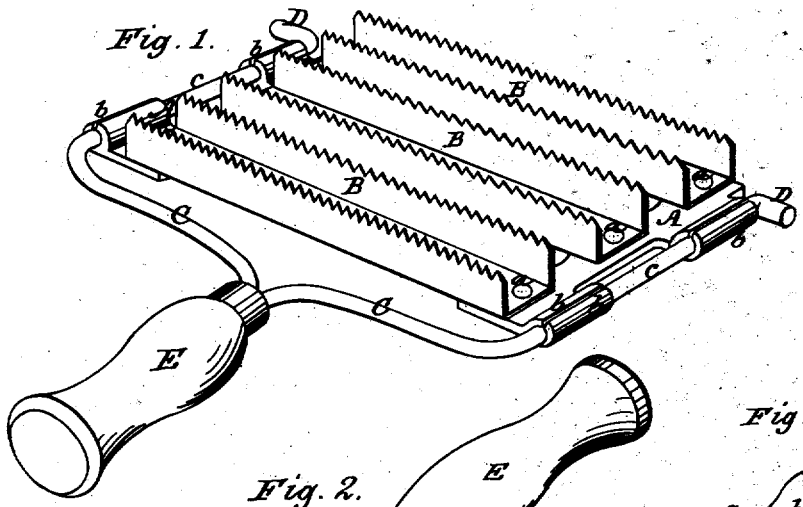
Figure 2:
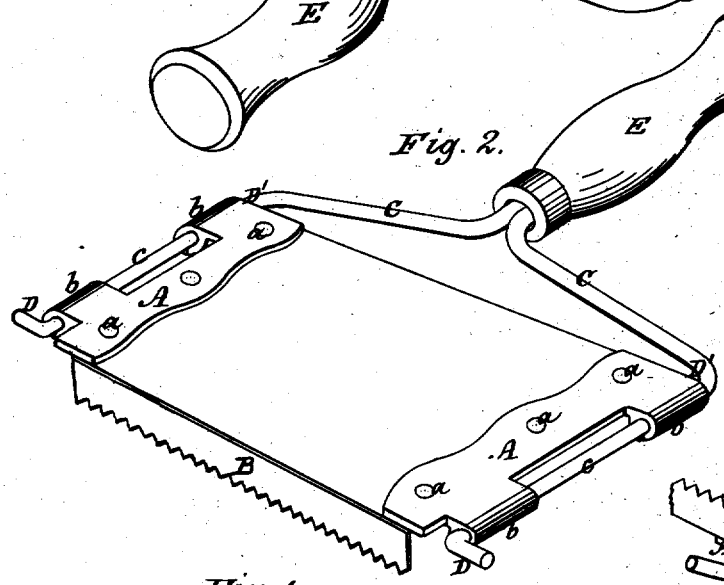
Figure 3:
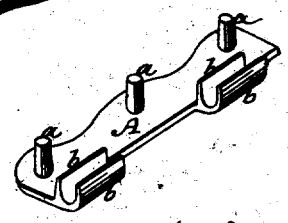
Figure 5:
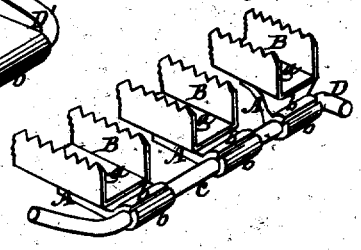
Figure 4:
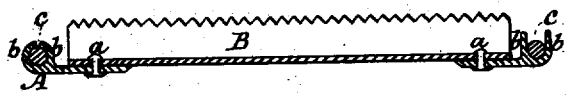

Figure 1 represents, in perspective, the face, and Fig. 2 represents, in perspective, the back, of curry-combs having my improvements. Fig. 3 is a perspective view of an end bar separate from a comb. Fig. 4 is a sectional view of a curry-comb, showing one of the lug-blanks of the end bars open and the other closed around the shank-frame. Fig. 5 represents, in perspective, a portion of a curry-comb, having each comb-bar united to the shank-frame by a separate lug or end bar.

Similar letters of reference denote like parts in all the figures.

My invention consists in my peculiar manner or method of attaching or securing a series or set of comb-bars to the shank-frame of curry-combs by transverse connecting end bars, or by end pieces formed of malleable metal, and provided with lug-blanks in such a manner that a set or series of comb bars have their respective ends secured or riveted to the said connecting end bars or pieces, and thus form the body of the curry-comb. The said lug-blanks thereof are inclosing the shank-frame, or are closed tightly on and around the shank-frame of the curry-comb, thereby securing said comb-bars firmly to said shank-frame; and, as an additional protection against rough usage, I bend the wire forming the shank-frame adjacent to the body of the curry-comb where it enters in, and also where it exits from, the body of the curry-comb.

My invention also consists in forming of and with the end or ends of the shank-frame of curry-combs, a fender-knob or knocking-lug, in the manner and for the purpose as hereinafter set forth.

To enable others skilled in the art to make and use my invention, I will proceed to describe the same with reference to the drawings.

The end bars or end pieces A are made of malleable cast metal, or of any other suitable metal, according to the class of comb desired. If made of malleable cast metal, they are provided with rivet studs or blanks *a* and lug-blanks *b*, the rivet-studs being substantially as shown in Fig. 3 of the annexed drawings. To a set or pair of these end bars or pieces A there is riveted, at their respective end parts, by rivets *a*, a set or series of trough-shaped comb-bars, B. The body of the comb thus prepared is now to be secured to the shank-frame C. To facilitate this operation the shank-frame is bent in suitable places upon its length at D and D′, and united to the handle E before connecting it to the body of the comb. This is accomplished by first taking a suitable length of wire, C, and bending outwardly at about right angles with the comb ends the ends of the shank-frame rods C, thereby forming a head, D, which serves to hold the comb at one side from slipping off the shank-frame C, while the short bend formed at D′ on the shank-frame is to retain the comb upon the other side. The sides *c c* of the shank-frame are now placed in the groove between the lug-blanks *b b*, with the bends D and D′ adjacent to the body of the comb. Said lug-blanks are then bent down or closed tightly on the shank-rods *c c* with a hammer, or by other convenient means, substantially in the manner as shown in section in Fig. 4, thus producing a strong and durable comb at a moderate cost.

In Fig. 5 is shown a similar mode of connecting each comb-bar to the sides of the shank-frame C by means of separate end pieces A, provided with lugs *b;* but this mode does not produce a comb as desirable as those shown in Figs. 1, 2, and 4.

The ends of the shank-frame *c c* are so far bent outward as to project sufficiently at about right angles to the comb ends, that the part so bent, in addition to its holding the comb from slipping off the shank-frame end, shall also form a guard or fender knob, D, substantially in manner as shown in Figs. 1 and 2 of annexed drawings, which knob or fender guard is to prevent bruising the comb ends by rapping the said guard D, instead of the comb ends, upon any hard substance, to clean the comb of hair or dirt by rapping the same, as is commonly done.

I make the aforesaid end bars or end pieces A either of cast malleable iron or metal, as the desired quality, strength, and durability of combs may require. The malleable cast end bars or pieces are most readily secured to the comb-bars and make the strongest and most durable article of curry-combs.

I am aware that the comb-plates or the end pieces uniting them have been connected with wires forming the shank of a curry-comb by means of independent and separate sheet-iron straps folded over, and rivets used to fasten both ends of said strap to the top of the curry-comb; but I am not aware that the comb-bars have been united by wrought or malleable iron end pieces formed with extensions or lugs, said lugs being wrapped around the wire to unite the comb-bars with the wire shanks of the handle without extra rivets.

Having thus fully described my invention, what I claim is—

1. A malleable cast-metal end piece for curry-combs, having lugs *b b* formed thereon, and rivet-holes or rivet-blanks *a a a* cast or formed thereon, so that said piece shall not only facilitate the putting together of the parts, but serve as the means of holding them together when clinched or hammered down, as described.

2. In a curry-comb, a series of sheet-metal comb-bars, B, riveted to malleable cast-metal end pieces A A, which end pieces have lugs *b b*, bent tight upon or around the wire frame, which is a continuation of the shank for the handle, as and for the purpose set forth.

3. The wire shanks or wire frame of a curry-comb, bent adjacent to both its point of entrance with, and point of exit from, its connection with the body of the curry-comb, substantially as set forth.

4. The outer bent ends of the wire frame as knocking lugs or fenders D D, as and for the purpose set forth.

MILES SWEET.

Witnesses:

CHARLES A. HOTCHKISS,

E. E. MASSON.